United States Patent Office 2,862,005
Patented Nov. 25, 1958

2,862,005

DODECAHYDROPHENANTHRENE COMPOUNDS AND PROCESSES FOR PREPARING THE SAME

Robert M. Lukes, Nixon, and George I. Poos, North Plainfield, N. J., assignors to Merck & Co., Inc., Rahway, N. J., a corporation of New Jersey No Drawing. Application December 31, 1953
Serial No. 401,706

13 Claims. (Cl. 260—340.9)

This invention relates to novel polyhydrophenanthrene compounds and processes of obtaining the same; more particularly, it is concerned with new 2,4b-dimethyl-1,2,3,4,4a,4b,5,6,7,9,10,10a - dodecahydrophenanthrene compounds having functional substituents in positions 1, 4 and 7, novel intermediate compounds useful in preparing these dimethyl dodecahydrophenanthrene compounds, and methods of producing these compounds.

The novel 2,4b-dimethyl-1,2,3,4,4a,4b,5,6,7,9,10,10a-dodecahydrophenanthrene compounds of our invention which may be represented as follows:

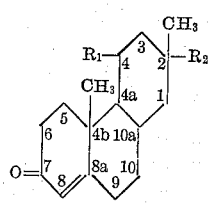

wherein $R_1$ is a radical from the group consisting of keto, hydroxy, and acyloxy, and $R_2$ is a radical selected from the group consisting of acyl and hydrogen, and ketone derivatives thereof, are useful in the preparation of other polyhydrophenanthrene compounds, and in the preparation of valuable steroid compounds.

It is an object of our invention to provide novel 2,4b-dimethyl - 1,2,3,4,4a,4b,5,6,7,9,10,10a - dodecahydrophenanthrene compounds having functional substituents in positions 1, 4 and 7. It is a further object to provide processes for the preparation of said 2,4b-dimethyl-dodecahydrophenanthrene compounds by the addition of a 2-methyl substituent to 4b-methyl-1,2,3,4,4a,4b,5,6,7,9,10,10a-dodecahydrophenanthrene compounds.

Another object is to provide new 2-acyl derivatives of 4b-methyl-1,2,3,4,4a,4b,5,6,7,9,10,10a-dodecahydrophenanthrene-1,4,7-trione and 4b-methyl-1,2,3,4,4a,4b,5,6,7,9,10,10a-dodecahydrophenanthrene-4-ol-1,7-dione, or derivatives thereof, and processes of obtaining the same.

An additional object is to provide the novel products, 2,4b - dimethyl - 1,2,3,4,4a,4b,5,6,7,9,10,10a - dodecahydrophenanthrene-1,4,7-trione and 2,4b-dimethyl-1,2,3,4,4a,4b,5,6,7,9,10,10a - dodecahydrophenanthrene-4-ol-1,7-dione or derivatives thereof, and processes for producing the same.

Still another object is to provide a process for converting 2,4b-dimethyl-1,2,3,4,4a,4b,5,6,7,9,10,10a-dodecahydrophenanthrene-4-ol-1,7-dione or derivatives thereof to the corresponding 2,4b-dimethyl-1,2,3,4,4a,4b,5,6,7,9,10,10a-dodecahydrophenanthrene-1,4,7-trione-compounds.

Other objects will be apparent from the detailed description hereinafter provided.

In accordance with the present invention, we have found that derivatives of 4b-methyl-1,2,3,4,4a,4b,5,6,7,9,10,10a-dodecahydrophenanthrene-4-ol-1,7-dione, the corresponding 4-acyloxy compounds, and 4b-methyl-1,2,3,4,4a,4b,5,6,7,9,10,10a - dodecahydrophenanthrene - 1,4,7-trione wherein the 7-keto substituent is blocked by a group which is reconvertible to keto by hydrolysis, can be readily converted to the corresponding 2,4b-dimethyl-dodecahydrophenanthrene compounds. Our method of introducing the 2-methyl substituent can be conveniently illustrated by the following reaction scheme showing the application of our processes to certain 7-ketal derivatives of the starting materials:

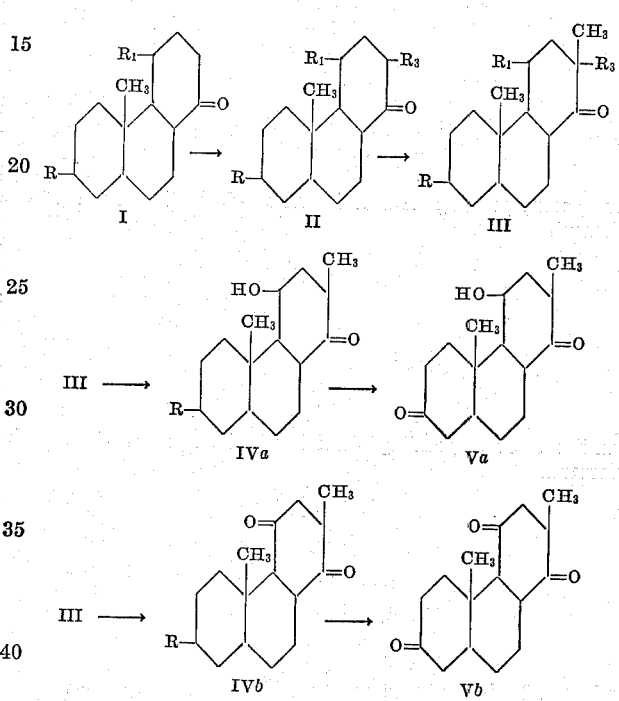

wherein R is a ketal substituent convertible to keto by hydrolysis, $R_1$ is a keto, hydroxy or acyloxy group, and $R_3$ is an acyl radical.

In accordance with the foregoing reaction scheme the starting dodecahydrophenanthrene compound (I) is acylated to form the corresponding 2-acyl derivative (II) which is then methylated to produce the 2-acyl-2-methyl compound (III). Compound III on cleavage of the acyl substituent forms the 4-ol compound (IVa) or the 4-one compound, depending upon the substituent in the 4-position, which on hydrolysis yield respectively the 4-ol-1,7-dione compound (Va) and the 1,4,7-trione compound (Vb).

In accordance with one embodiment of our invention, the starting compounds, 4b-methyl-1,2,3,4,4a,4b,5,6,7,9,10,10a-dodecahydrophenanthrene-4-ol-1,7-dione, its 4-acyloxy derivative, or 4b-methyl-1,2,3,4,4a,4b,5,6,7,9,10,10a-dodecahydrophenanthrene-1,4,7-trione, wherein the 7-keto substituent is blocked by the formation of a suitable derivative, are acylated by reaction with an ester in the presence of an alkaline condensing agent to form the corresponding 2-acyl derivative.

The 7-keto substituent is blocked during our process in order to prevent acylation or alkylation in ring A. This blocking of the 7-keto group is conveniently accomplished by the preparation of a ketone derivative which is reconvertible by acid hydrolysis to a keto substituent. Suitable ketone derivatives for this purpose that might be mentioned are enol ethers and cyclic ketals. Thus, enol ether derivatives of the formula

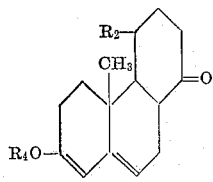

wherein $R_2$ is the same as defined above and $R_4$ is a hydrocarbon radical, are suitable starting materials in our process. The methyl and ethyl enol ethers which are readily prepared are particularly suitable as starting materials. Cyclic ketal derivatives, such as the 7-ethylenedioxy derivative of the formula

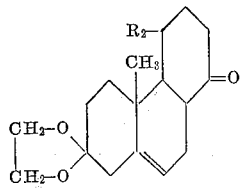

the corresponding monothio ketal derivative of the formula

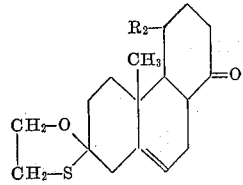

and the corresponding dithioketal derivatives of the formula

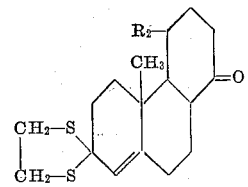

wherein $R_2$ is the same as defined above, are also useful in our process of introducing the 2-methyl substituent. Similarly, other cyclic ketal derivatives such as the trimethylene, propylene, and butylene ketals, can be used to protect the 7-keto substituent. Upon hydrolyzing these enol ether and ketal derivatives with acid, the protecting substituent is cleaved and the 7-keto compound having a double bond in position 8, 8a is obtained.

The acylation step is effected by reacting the starting materials with an ester in the presence of an alkaline condensing agent in a suitable non-reactive solvent. Various organic esters can be employed in this reaction. For example, esters of the fatty acids such as methyl acetate, propyl acetate, ethyl propionate, amyl acetate, methyl caproate, ethyl caprylate, benzyl acetate, octyl acetate, decyl propionate, and the like; esters of aryl carboxylic acids such as ethyl benzoate, propyl benzoate, benzyl benzoate, and the like; and the esters of aralkyl carboxylic acids such as methyl phenylacetate, benzyl phenylacetate, propylphenylacetate, and the like; can be used in the process of our invention to produce the corresponding 2-acyl derivatives. We have found that this acylation is most conveniently effected with an ester of an organic acid having one or two carbon atoms. We have obtained maximum yields of the desired acyl derivative by using lower alkyl esters of such acids as carbonic acid, formic acid or acetic acid. Thus, for example, the condensation can be effected with esters such as methyl carbonate, methyl formate or methyl acetate to form respectively the corresponding 2-carbomethoxy, 2-formyl, or 2-acetoxy derivatives. Various strong alkaline condensing agents such as the alkali metal hydrides, amides or alkoxides can be employed in this condensation. However, we have found it most convenient to condense the ketone and the ester in the presence of sodium hydride or sodium methylate in a suitable solvent medium such as an alcohol or a hydrocarbon (inter alia methyl alcohol, benzene and the like) since under these conditions we have obtained maximum yields of the desired products. The acylation is most conveniently effected by stirring the reaction mixture at room temperature for sufficient time to complete the reaction. When 1,4-diketo compounds are acylated, we have found that higher yields are obtained by conducting the reaction in the absence of oxygen, for example in an atmosphere of nitrogen or another inert gas. The acylated products are readily recovered from the reaction mixture by adding water and aqueous acid and then extracting the product with a suitable immiscible solvent.

When the starting material contains a hydroxy substituent at C-4, acylation of this hydroxyl occurs if longer reactions times and increased amounts of acylating agents are employed.

Pursuant to a further embodiment of our invention, we have found that the 2-acyl derivatives (II) are readily methylated by reaction with a methyl halide in the presence of an alkali to form the corresponding 2-acyl-2-methyl compound. For example, this methylation is conveniently effected by adding the 2-acyl compound to a suspension of potassium carbonate in acetone, adding an excess of methyl iodide, and stirring the reaction mixture at room temperature for sufficient time to complete the reaction. The 2-acyl-2-methyl compound can be isolated by extraction of the reaction mixture with a suitable organic solvent, and concentration of the solvent extract.

In accordance with a further embodiment of our invention, the 2-acyl-2-methyl compounds (III) are cleaved to remove the 2-acyl substituent by reaction with a base to form the corresponding 2-methyl compound. Thus, this cleavage can be accomplished by heating a solution of the 2-acyl-2-methyl compound with an alkali metal hydroxide, carbonate or bicarbonate. Alternatively, this cleavage is also effected by subjecting the 2-acyl-2-methyl compound to chromatography over basic alumina. The 2,4b-dimethyl compound (IV$a$ or IV$b$) is isolated from the alkaline reaction mixture by extraction into an organic solvent and subsequent removal of the solvent.

The 2,4b-dimethyl compounds (IV$a$ or IV$b$) can then be hydrolyzed by treatment with acid or a substance giving rise to acids to convert the ketone derivative at C-7 to a keto group and form the 4-ol-1,7-dione compound (V$a$) or the 1,4,7-trione compound (V$b$). These latter compounds as well as their immediate precursors, compounds IV$a$ and IV$b$, are important intermediates in a total synthesis of adrenal cortical hormones such as cortisone and dihydrocortisone. The reactions of the present invention provide a method for attachment of the future angular methyl group at C-13 of the steroid nucleus.

Thus, 2,4b-dimethyl-7-ethylenedioxy-1,2,3,4,4a,4b,5,6,7, 8,10,10a-dodecahydrophenanthrene-4-ol-1-one or the corresponding 1,4-dione compound can be converted to the valuable adrenal hormones, 11-dehydrocorticosterone and cortisone, in accordance with the following procedures:

Upon reacting 2,4b-dimethyl-7-ethylenedioxy-1,2,3,4,4a, 4b,5,6,7,8,10,10a - dodecahydrophenanthrene - 4 - ol-1-one with methallyl iodide in the presence of potassium t-butoxide the corresponding 2-methallyl derivative, M. P. 166–168° C., is produced, which on oxidation with the chromium trioxide-pyridine complex yields the corresponding 1,4-diketone, M. P. 139° C. This same diketone is also obtained by reacting 2,4b-dimethyl-7-ethylenedioxy-1,2,3, 4,4a,4b,5,6,7,8,10,10a-dodecahydrophenanthrene - 1,4 - dione with methallyl iodide in the presence of potassium t-butoxide. Condensation of 2-methallyl-2,4b-dimethyl-7-ethylenedioxy - 1,2,3,4,4a,4b,5,6,7,8,10,10a - dodecahydrophenanthrene-1,4-dione with ethoxyacetyl magnesium bromide yields 2,4b-dimethyl-2-methallyl-1-ethoxyethinyl-7-ethylenedioxy - 1,2,3,4,4a,4b,5,6,7,8,10,10a - dodecahydrophenanthrene-1-ol-4-one, M. P. 131–132° C. When this ethoxyethinyl compound is treated with dilute sulfuric acid, 2,4b-dimethyl-2-methallyl-1-carboethoxy-methylene-7 - ethylenedioxy - 1,2,3,4,4a,4b,5,6,7,8,10,10a - dodecahydrophenanthrene-4-one, M. P. 94–96° C. is obtained. Upon hydrolyzing this compound with alkali the corresponding free acid, M. P. 203–205° C. is produced. Reduction of this keto acid with sodium borohydride to the 4-hydroxy acid, followed by reduction of the conjugated double bond with potassium-ammonia-isopropyl alcohol affords 2,4b-dimethyl-1-carboxymethyl-2-methallyl-7-ethylenedioxy-1,2,3,4,4a,4b,5,6,7,8,10,10a - dodecahydrophenanthrene-4-ol, M. P. 255–257° C. Reduction of this carboxymethyl compound with lithium aluminum hydride yields the corresponding 1-($\beta$-hydroxyethyl) derivative M. P. 199–201° C. and 210–211° C., which on reaction with p-toluene sulfonyl chloride in the presence of pyridine gives the 1-($\beta$-toluene sulfonate), M. P. 157–158° C. Successive oxidations of this monotyslate derivative with the chromium trioxide-pyridine complex, with osmium tetroxide and with periodic acid yields 2,4b-dimethyl-1$\beta$-($\beta$-p-toluenesulfonyloxyethyl)-2-acetonyl-7-ethylenedioxy-1,2,3,4,4a,4b,5,6,7,8,10,10a - dodecahydrophenanthrene-4-one, M. P. 105–108° C. Upon reacting this product with sodium methoxide dl - 3 - ethylenedioxy-$\Delta^5$-17-pregnene-11,20-dione, M. P. 212–214° C. is obtained which on equilibration with alkali gives the 3-ethylenedioxy derivative of dl-11-keto progesterone, M. P. 181–182.5° C. Acid hydrolysis of this product affords dl-11-ketoprogesterone. Reaction of the 3-ethylenedioxy derivative of dl-11-ketoprogesterone with an oxalyl ester yields the corresponding 21-oxalyl ester compound which on hydrolysis is converted to the free acid. Resolution of the dl-21-oxalyl acid by means of the strychnine salt followed by hydrolysis of the oxalyl acid group gives 3-ethylenedioxy-$\Delta^5$-pregnene-11,20-dione, M. P. 175–176.5° C. which on hydrolysis with acid affords 11-ketoprogesterone, identical with material prepared from natural sources. Iodination and acetoxylation of the 21-oxalyl acid of 3-ethylenedioxy-$\Delta^5$-pregnene-11,20-dione obtained as described above yields successively crystalline 3-ethylenedioxy-21-iodo-$\Delta^5$-pregnene-21-ol-11,20-dione and 3-ethylenedioxy-$\Delta^5$-pregnene-21-ol-11,20-dione acetate, M. P. 193.5–194° C. Acid hydrolysis of this latter compound yields 11-dehydrocorticosterone identical with the product obtained from natural sources. Conversion of the 3-ethylenedioxy-$\Delta^5$-pregnene -21-ol-11,20-dione acetate to the 20-cyanhydrin, M. P. dec. 220–224° C., and dehydration of this product gives the $\Delta^{5,17}$-20-cyanopregnadiene, M. P. 203° C. which on oxidation with potassium permanganate yields 3-ethylenedioxy-$\Delta^5$-pregnene-17,21-diol-11,20-dione acetate, dec. 262–267° C. Acid hydrolysis of the latter compound yielded cortisone acetate. These reactions are described in the publication entitled "Stereospecific Total Synthesis of Cortisone" which appeared in the Journal of the American Chemical Society, volume 74, pages 4974–4975.

The various compounds of our invention having a 4-hydroxy substituent can be readily oxidized by treatment with an oxidizing agent such as pyridine-chromium trioxide complex to convert this substituent to a keto group. Similarly, a 4-acyloxy substituent can be hydrolyzed to obtain the 4-hydroxy compound which can be oxidized to the corresponding 4-keto compound.

The 4b - methyl - 1,2,3,4,4a,4b,5,6,7,9,10,10a-dodecahydrophenanthrene-1,4,7-trione and the 7-ethylenedioxy derivative thereof utilized as starting materials in this invention can be prepared as described in copending application Serial No. 293,672, filed June 14, 1952.

The 4b - methyl - 1,2,3,4,4a,4b,5,6,7,9,10,10a-dodecahydrophenanthrene-4-ol-1,7-dione, its 4-acyloxy derivatives and the 7-ethylenedioxy derivatives of these compounds used as starting materials in the present invention can be prepared as described in copending application Serial No. 286,808, filed May 8, 1952.

Thus, the 7-ethylenedioxy derivative of 4b-methyl-1,2,3,4,4a,4b,5,6,7,9,10,10a - dodecahydrophenanthrene - 1,4,7-trione and the corresponding 4-ol-1,7-dione compound can be prepared as follows:

$\beta$-Ethoxy-propionaldehyde is reacted with ethyl magnesium bromide to produce 1-ethoxy-3-hydroxy-pentane which is oxidized with chromic acid to form 1-ethoxy-3-keto-pentane. Upon reacting this compound with ethyl orthoformate in alcohol solution containing a trace of hydrogen chloride, 1,3,3-triethoxy-pentane is obtained. Reaction of the latter compound with hot potassium acid sulfate produces 3-ethoxy-1,3-pentadiene. When the 3-ethoxy-1,3-pentadiene is condensed with benzoquinone in accordance with the Diels-Alder procedure, 5-methyl-6-ethoxy-1,4,4a,5,8,8a-hexahydronaphthalene - 1,4 - dione is obtained. Hydrogenation of this compound in the presence of Raney nickel produced 5-methyl-6-ethoxy-1,2,3,4,4a,5,8,8a-octahydronaphthalene - 1,4 - dione. Further reduction of this compound by reaction with lithium aluminum hydride affords the corresponding diol, 5-methyl-6-ethoxy-1,2,3,4,4a,5,8,8a - octahydronaphthalene-1,4-diol. Upon reacting this compound with dilute acetic acid, 5-methyl-6-keto-perhydronaphthalene-1,4-diol is obtained. When the 5-methyl-6-keto-perhydronaphthalene is condensed with methyl vinyl ketone in an alkaline reaction medium 7-keto-4b-methyl-1,2,3,4,4a,4b,5,6,7,9,10,10a-dodecahydrophenanthrene-1,4-diol is obtained. Upon reacting the latter product with ethylene glycol in the presence of p-toluene sulfuric acid the corresponding 3-ethylenedioxy derivative, 4b-methyl-7-ethylenedioxy-1,2,3,4,4a,4b,5,6,7,8,10,10a-dodecahydrophenanthrene-1,4-diol is obtained. Oxidizing this compound by reaction with aluminum isopropoxide in the presence of cyclohexanone forms a mixture containing 4b-methyl-7-ethylenedioxy-1,2,3,4,4a,4b,5,6,7,8,10,10a - dodecahydrophenanthrene-1,4-dione and the corresponding 4-ol-1-one compound which can be separated and recovered by fractional crystallization and/or chromatography. Similarly, upon reacting 7-keto-4b-methyl - 1,2,3,4,4a,4b,5,6,7,9,10,10a - dodecahydrophenanthrene-1,4-diol with an alcohol, such as methanol or ethanol, in the presence of an acidic catalyst, the corresponding enol ethers are obtained which may be oxidized by reaction with aluminum isopropoxide in the presence of cyclohexanone to obtain the enol ethers of 4b-methyl - 7 - ethylenedioxy-1,2,3,4,4a,4b,5,6,7,9,10,10a-dodecahydrophenanthrene-1,4-dione and the corresponding 4-ol-1-one compound which can be separated and recovered by fractional crystallization and/or chromatography.

This application is a continuation-in-part of our application Serial No. 278,128, filed March 22, 1952, now abandoned, and of our application Serial No. 293,456, filed June 13, 1952, now abandoned.

The following examples are illustrative of specific embodiments of our invention:

EXAMPLE 1

*4b-methyl-2-formyl-7-ethylenedioxy-1,2,3,4,4a,4b,5,6,7, 8,10,10a-dodecahydrophenanthrene-4-ol-1-one*

To a solution of 0.25 g. of sodium hydride in 3.5 cc. of absolute methanol was added 1.5 g. of methyl formate and 1.0 g. of 4b-methyl-7-ethylenedioxy-1,2,3,4,4a,4b,5,6,7,8,10,10a-dodecahydrophenanthrene-4-ol-1-one, and the mixture was stirred for 16 hours at room temperature. To the mixture was then added 20 cc. of water, and the resulting solution extracted with benzene. The benzene extract was back-extracted with 10 cc. of water, which was added to the original aqueous solution. This aqueous solution was made acid by addition of sodium dihydrogen phosphate and extracted with chloroform. Evaporation of the chloroform extracts gave a crystalline residue of 4b-methyl-2-formyl-7-ethylenedioxy-1,2,3,4,4a,4b, 5,6,7,8,10,10a-dodecahydrophenanthrene-4-ol-1-one, M. P. 182–185° C. after recrystallization.

This 7-ethylenedioxy derivative on hydrolysis with acid yields 4b-methyl-2-formyl-1,2,3,4,4a,4b,5,6,7,9,10,10a-dodecahydrophenanthrene-4-ol-1,7-dione.

EXAMPLE 2

*2,4b-dimethyl-2-formyl-7-ethylenedioxy-1,2,3,4,4a,4b,5, 6,7,8,10,10a-dodecahydrophenanthrene-4-ol-1-one*

To a suspension of 11 g. of anhydrous potassium carbonate in 120 cc. of acetone was added 5.4 g. of 4b-methyl-2-formyl-7-ethylenedioxy - 1,2,3,4,4a,4b,5,6,7,8,10,10a-dodecahydrophenanthrene-4-ol-1-one. The mixture was stirred for 1½ hours, 13 ml. of methyl iodide was added, and the stirring was continued for 16 hours, at room temperature. The mixture was then evaporated to one-third volume, and 600 cc. of benzene added. The benzene solution was washed with 100 cc. of ice-cold 1 N aqueous potassium hydroxide solution. Evaporation of the benzene gave a crystalline residue containing 2,4b-dimethyl-2-formyl - 7 - ethylenedioxy-1,2,3,4,4a,4b,5,6,7,8, 10,10a-dodecahydrophenanthrene-4-ol-1-one. Hydrolysis of the latter compound with acid yields 2,4b-dimethyl-2-formyl-1,2,3,4,4a,4b,5,6,7,9,10,10a-dodecahydrophenanthrene-4-ol-1,7-dione.

EXAMPLE 3

*2,4b-dimethyl-7-ethylenedioxy-1,2,3,4,4a,4b,5,6,7,8,10, 10a-dodecahydrophenanthrene-4-ol-1-one*

4 grams of a crude mixture containing 2,4b-dimethyl-2-formyl-7-ethylenedioxy - 1,2,3,4,4a,4b,5,6,7,8,10,10a-dodecahydrophenanthrene-4-ol-1-one was chromatographed over alkaline alumina from benzene. Elution with petroleum ether-ether mixture (4:6) and concentration of the eluates yielded 2,4b-dimethyl-7-ethylenedioxy-1,2,3,4, 4a,4b,5,6,7,8,10,10a-dodecahydrophenanthrene-4-ol-1-one, M. P. 186–189° C. This compound on hydrolysis with acid yields 2,4b-dimethyl-1,2,3,4,4a,4b,5,6,7,9,10,10a-dodecahydrophenanthrene-4-ol-1,7-dione.

EXAMPLE 4

*2,4b - dimethyl-7-ethylenedioxy-1,2,3,4,4a,4b,5,6,7,8,10, 10a-dodecahydrophenanthrene-4-ol-1-one*

Four hundred eighty-one milligrams of 2,4b-dimethyl-2 - formyl - 7-ethylenedioxy-1,2,3,4,4a,4b,5,6,7,8,10,10a-dodecahydrophenanthrene-4-ol-1-one in 5 cc. of 0.5 N methanolic potassium hydroxide was heated on the steam bath for ten minutes. 10 cc. of water was added and the methanol removed in vacuo. The resultant aqueous suspension was extracted with chloroform. The chloroform extract was dried, and concentrated in vacuo to a yellow oil. Ether trituration of this oil afforded crude crystalline 2,4b - dimethyl-7-ethylenedioxy-1,2,3,4,4a,4b,5,6,7,8, 10,10a - dodecahydrophenanthrene-4-ol-1-one. Purification was accomplished by chromatography from benzene-petroleum ether on acid washed alumina. Elution with petroleum ether-ether (6:4) gave essentially pure material, M. P. 185–190° C.

EXAMPLE 5

*4b - methyl-2-acetyl-7-ethylenedioxy-1,2,3,4,4a,4b,5,6,7,8, 10,10a-dodecahydrophenanthrene-4-ol-1-one*

To a suspension of 2.5 g. of sodium methoxide in 5 cc. of benzene was added 1.0 g. of 4b-methyl-7-ethylenedioxy - 1,2,3,4,4a,4b,5,6,7,8,10,10a - dodecahydrophenanthrene-4-ol-1-one and 3 cc. of methyl acetate, and the mixture was stirred for 24 hours at room temperature. The mixture was then diluted with 100 cc. of benzene and 10 cc. of water. The aqueous layer was separated and extracted with 150 cc. benzene. The combined benzene extracts were extracted with 20 cc. of water, which was added to the original aqueous extract. The combined aqueous extract was acidified with sodium dihydrogen phosphate and extracted with chloroform. Evaporation of the chloroform extract gave a crystalline residue of 4b - methyl-2-acetyl-7-ethylenedioxy-1,2,3,4,4a,4b,5,6,7, 8,10,10a-dodecahydrophenanthrene-4-ol-1-one, M. P. after recrystallization, 200–205° C. Hydrolysis of this compound with acid yields 4b-methyl-2-acetyl-1,2,3,4,4a,4b,5, 6,7,9,10,10a-4-ol-1,7-dione.

EXAMPLE 6

*2,4b - dimethyl-2-acetyl-7-ethylenedioxy-1,2,3,4,4a,4b,5,6, 7,8,10,10a-dodecahydrophenanthrene-4-ol-1-one*

To a suspension of 200 mg. of potassium carbonate in 2 cc. of acetone was added 80 mg. of 4b-methyl-2-acetyl-7 - ethylenedioxy - 1,2,3,4,4a,4b,5,6,7,8,10,10a-dodecahydrophenanthrene-4-ol-1-one, and the mixture was stirred for a half hour. Then 0.5 cc. methyl iodide was added, and the stirring was continued for 16 hours at room temperature. The mixture was then evaporated to dryness, and the residue extracted with 25 cc. of 7:3 benzene-ether mixture. Evaporation of the benzene-ether gave a residue containing the two epimeric modifications of 2,4b-dimethyl - 2 - acetyl-7-ethylenedioxy-1,2,3,4,4a,4b,5,6,7,8, 10,10a - dodecahydrophenanthrene - 4-ol-1-one. Separation by fractional crystallization from acetone-petroleum ether gave the two epimers, M. P. 185–195° C. and 132–134.5° C. Hydrolysis of these epimers with acid yield the corresponding 1,7-dione compounds.

EXAMPLE 7

*2,4b - dimethyl - 7-ethylenedioxy-1,2,3,4,4a,4b,5,6,7,8,10, 10a-dodecahydrophenanthrene-4-ol-1-one*

To 0.9 g. of crude 2,4b-dimethyl-2-acetyl-7-ethylenedioxy - 1,2,3,4,4a,4b,5,6,7,8,10,10a - dodecahydrophenanthrene-4-ol-1-one was added 25 cc. of 1 M potassium carbonate in 50% aqueous methanol, and the resulting solution was boiled, under reflux for 2 hours. The methanol was removed in vacuo and the remaining aqueous solution was extracted with two 100 cc. portions of benzene. Evaporation of the benzene gave a crystalline residue of 2,4b - dimethyl - 7-ethylenedioxy-1,2,3,4,4a,4b,5,6,7,8,10, 10a - dodecahydrophenanthrene-4-ol-1-one, M. P. 186–189° C. after recrystallization from acetone-petroleum ether.

EXAMPLE 8

*4b - methyl-2-acetyl-7-ethylenedioxy-1,2,3,4,4a,4b,5,6,7,8, 10,10a - dodecahydrophenanthrene - 4-ol-1-one and 4b-methyl - 2-acetyl-7-ethylenedioxy-1,2,3,4,4a,4b,5,6,7,8, 10,10a-dodecahydrophenanthrene-4-ol-1-one acetate*

To a rapidly stirred suspension of 3.2 g. (0.059 mole) of sodium methoxide (baked at 200° C. and 0.05 mm. for 1.5 hours) in 15 cc. of anhydrous benzene were added in succession, 4.0 g. of 4b-methyl-7-ethylenedioxy-1,2,3, 4,4a,4b,5,6,7,8,10,10a - dodecahydrophenanthrene-4-ol-1-one (I) and 15 cc. of methyl acetate; the flask was stoppered and the mixture was stirred for about 16 hours. The mixture was then poured into 50 cc. of water and 50 cc. of benzene. The aqueous layer was separated, and the organic layer was extracted twice with water, and then with cold 1 N aqueous potassium hydroxide. The combined aqueous extracts were acidified with solid sodium dihydrogen phosphate and extracted thrice with chloroform. Evaporation of the combined chloroform extracts left 3.4 g. of crystalline residue which could be fractionally crystallized from acetone-petroleum ether into 1.8 g. (40%) of 4b-methyl-2-acetyl-7-ethylenedioxy-1,2,3,4,4a,4b,5,6,7,8,10,10a - dodecahydrophenanthrene-4-ol-1-one, M. P. 201–204° C., λ max. 291 mu, E mol 10,300, and 1.6 g. (31%) of 4b-methyl-2-acetyl-7-ethylenedioxy - 1,2,3,4,4a,4b,5,6,7,8,10,10a - dodecahydrophenanthrene-4-ol-1-one acetate, M. P. 159–161° C., λ max. 290 mu, E mol 10,700. The infrared absorption spectra showed maxima at 2.84 mu (OH) and 6.22–6.30 mu (COCHCO) for the former and at 5.80 mu (COO), 6.23 mu (COCHCO), and 8.03 mu (COOC) for the latter compound.

EXAMPLE 9

*2,4b - dimethyl-2-acetyl-4-acetoxy-7-ethylenedioxy-1,2,3,4, 4a,4b,5,6,7,8,10,10a-dodecahydrophenanthrene-1-one*

To a suspension of 4.0 g. potassium carbonate in 15 cc. acetone was added 1.2 g. of a crystalline mixture containing 4b-methyl-2-acetyl-4-acetoxy-7-ethylenedioxy-1,2,3,4,4a,4b,5,6,7,8,10,10a-dodecahydrophenanthrene - 1-one and 8 cc. methyl iodide. After stirring for 16 hours at room temperature, the mixture was evaporated to a slurry, and 200 cc. benzene added. After washing with 20 cc. water and two 10 cc. portions of cold 1 N aqueous sodium carbonate, evaporation of the benzene gave an oily residue. This, by fractional crystallization from acetone-petroleum ether yielded 2,4b-dimethyl-2-acetyl-4-acetoxy-7 - ethylenedioxy - 1,2,3,4,4a,4b,5,6,7,8,10,10a-dodecahydrophenanthrene-1-one, M. P. 107–110° C.

EXAMPLE 10

*2,4b - dimethyl - 7-ethylenedioxy-1,2,3,4,4a,4b,5,6,7,8,10, 10a-dodecahydrophenanthrene-4-ol-1-one*

To 10 ml. of 1 N potassium carbonate in 50% aqueous methanol was added 50 mg. of 2,4b-dimethyl-2-acetyl-4-acetoxy - 7 - ethylenedioxy-1,2,3,4,4a,4b,5,6,7,8,10,10a-didecahydrophenanthrene-1-one and the resulting solution was boiled under reflux for 16 hours. The methanol was evaporated in vacuo, and the remaining aqueous layer extracted with chloroform. Evaporation of the chloroform extract gave a crystalline residue of 2,4b-dimethyl - 7 - ethylenedioxy-1,2,3,4,4a,4b,5,6,7,8,10,10a-didecahydrophenanthrene-4-ol-1-one, M. P. 185–188° C.

EXAMPLE 11

*4b - methyl - 2 - formyl - 7 - ethylenedioxy - 1,2,3,4,4a, 4b,5,6,7,8,10,10a-dodecahydrophenanthrene-1,4-dione*

A solution of 2.90 g. of 4b-methyl-7-ethylenedioxy-1,2,3,4,4a,4b,5,6,7,8,10,10a - dodecahydrophenanthrene-1,4-dione in 10 cc. of methanol was treated with 3.2 cc. of 3.1 N methanolic sodium methoxide and 5 cc. of methyl formate. The solution was stirred overnight at room temperature in the absence of air, then poured into ice water and extracted with ether. The aqueous alkaline solution was acidified with sodium dihydrogen phosphate and extracted with ether. Evaporation of the etheral extract and recrystallization of the residue from alcohol gave crystalline 4b-methyl-2-formyl-7-ethylenedioxy-1,2,3,4,4a,4b,5,6,7,8,10,10a - dodecahydrophenanthrene - 1,4 - dione, M. P. 159–161° C. Hydrolysis of this compound with acid yields 4b-methyl-2-formyl-1,2,3,4,4a,4b,5,6,7,9,10,10a-dodecahydrophenanthrene-1,4,7-trione.

EXAMPLE 12

*2,4b - dimethyl - 2 - formyl - 7 - ethylenedioxy - 1,2,3,4, 4a,4b,5,6,7,8,10,10a-dodecahydrophenanthrene-1,4-dione*

A solution of 318 mg. of 4b-methyl-2-formyl-7-ethylenedioxy - 1,2,3,4,4a,4b,5,6,7,8,10,10a - dodecahydrophenanthrene-1,4-dione in 3 cc. of acetone was stirred at room temperature overnight with 0.5 cc. of methyl iodide and 250 mg. of potassium carbonate. The mixture was then poured into water and ether, the etheral layer washed with aqueous sodium sulfite, then concentrated to dryness. The residue consisted of amorphous 2,4b-dimethyl - 2 - formyl - 7 - ethylenedioxy - 1,2,3,4,4a,4b,5,6,7,8,10,10a - dodecahydrophenanthrene - 1,4 - dione. Upon hydrolysis with acid this compound yields 2,4b-dimethyl - 2 - formyl - 1,2,3,4,4a,4b,5,6,7,9,10,10a - dodecahydrophenanthrene-1,4,7-trione.

EXAMPLE 13

*2,4b - dimethyl - 7 - ethylenedioxy - 1,2,3,4,4a,4b,5,6,7,8, 10,10a-dodecahydrophenanthrene-1,4-dione*

A solution of 350 mg. of crude 2,4b-dimethyl-2-formyl-7 - ethylenedioxy - 1,2,3,4,4a,4b,5,6,7,8,10,10a - dodecahydrophenanthrene-1,4-dione in benzene-petroleum ether was poured into a column of 7 g. of alkaline alumina. The alumina was eluted with ether-petroleum ether fractions and the eluates upon evaporation gave crystalline 2,4b - dimethyl - 7 - ethylenedioxy - 1,2,3,4,4a,4b,5,6,7,8, 10,10a - dodecahydrophenanthrene - 1,4 - dione, M. P. 148–149.5° C. Hydrolysis of this compound with acid yields 2,4b - dimethyl - 1,2,3,4,4a,4b,5,6,7,9,10,10a - dodecahydrophenanthrene-1,4,7-trione

EXAMPLE 14

*4b - methyl - 2 - carbomethoxy - 7 - ethylenedioxy - 1,2,3, 4,4a,4b,5,6,7,8,10,10a - dodecahydrophenanthrene - 1,4-dione*

To a suspension of 0.2 g. of sodium hydride in 25 cc. benzene were added 1.0 g. of 4b-methyl-7-ethylenedioxy-1,2,3,4,4a,4b,5,6,7,8,10,10a - dodecahydrophenanthrene-1,4-dione and 1.2 cc. methyl carbonate. The mixture was stirred 16 hours, and was then diluted with 25 cc. water and 20 cc. ether. The aqueous layer was separated, and after washing with 25 cc. ether, was acidified with sodium dihydrogen phosphate, and extracted with chloroform. Evaporation of the chloroform extract gave a crystalline residue of 4b-methyl-2-carbomethoxy-7-ethylenedioxy - 1,2,3,4,4a,4b,5,6,7,8,10,10a - dodecahydrophenanthrene-1,4-dione, M. P. after recrystallization from ethanol, 147–149° C. On hydrolysis with acid, this compound yields 4b - methyl - 2 - carbomethoxy - 1,2,3,4a, 4b,5,6,7,9,10,10a - dodecahydrophenanthrene - 1,4,7 - trione.

EXAMPLE 15

*2,4b - dimethyl - 2 - carbomethoxy - 7 - ethylenedioxy - 1, 2,3,4,4a,4b,5,6,7,8,10,10a - dodecahydrophenanthrene-1,4-dione*

A mixture of 0.12 g. of 4b-methyl-2-carbomethoxy-7-ethylenedioxy - 1,2,3,4,4a,4b,5,6,7,8,10,10a-dodecahydrophenanthrene-1,4-dione, 0.25 g. potassium carbonate, 1 cc. methyl iodide and 5 cc. acetone was stirred for 16 hours at room temperature and was then evaporated to one-half volume. The residue was extracted with benzene, and this extract, after washing with water, evaporated in vacuo, leaving a residue of the epimeric modifications of 2,4b-dimethyl-2-carbomethoxy-7-ethylenedioxy-1,2,3,4,4a,4b,5,6,7,8,10,10a - dodecahydrophenanthrene-1,4-dione, which could be separated and purified by fractional crystallization from ether to give the two epimeric modifications, M. P. 122–125° C. and M. P. 153–156° C. Hydrolysis of this compound with acid yields 2,4b-dimethyl - 2 - carbomethoxy - 1,2,3,4,4a,4b,5,6,7,9,10,10a-dodecahydrophenanthrene-1,4,7-trione.

EXAMPLE 16

*2,4b - dimethyl - 7 - ethylenedioxy - 1,2,3,4,4a,4b,5,6,7, 8,10,10a-dodecahydrophenanthrene-1,4-dione*

A heterogeneous mixture of 362 mg. of 2,4b-dimethyl-2 - carbomethoxy - 7 - ethylenedioxy - 1,2,3,4,4a,4b,5,6, 7,8,10,10a - dodecahydrophenanthrene - 1,4, - dione, 362 mg. of potassium carbonate, 2 ml. of water, and 4 ml. of methanol was stirred at room temperature for 3½ hours. It was homogeneous at the end of 2 hours. Most of the methanol was removed in vacuo and cold dilute hydrochloric acid added. Chloroform extraction yielded an oil which gave crystalline 2,4b-dimethyl-7-ethylenedioxy-1,2,3,4,4a,4b,5,6,7,8,10,10a - dodecahydrophenanthrene-1,4-dione, M. P. 122–128° C., when triturated with ether.

Hydrolysis with dilute hydrochloric acid produced the two isomeric 2,4b-dimethyl-1,2,3,4,4a,4b,5,6,7,9,10,10a-dodecahydrophenanthrene-1,4,7-triones, M. P. 170–174° C. and 138.5–140.5° C. These compounds were separated by chromatography over alumina from benzene-petroleum ether solution. One isomeric form was obtained by elution of the chromatogram with a mixture of 2:3 petroleum ether-ether and the second by elution with an ether-chloroform mixture.

EXAMPLE 17

*2,4b - dimethyl - 7 - ethylenedioxy - 1,2,3,4,4a,4b,5,6,7, 8,10,10a-dodecahydrophenanthrene-1,4-dione*

A heterogeneous mixture of 410 mg. of 2,4b-dimethyl-2 - carbomethoxy - 7 - ethylenedioxy - 1,2,3,4,4a,4b,5,6,7, 8,10,10a - dodecahydrophenanthrene - 1,4 - dione, 300 mg. of potassium bicarbonate, 4 cc. of water, and 2 cc. of methanol was refluxed for 2½ hours on the steam bath. 4 cc. more of water was added and the resultant solution was extracted with chloroform. Concentration of the magnesium sulfate-dried extract yielded an amber oil, which when first washed with ether, gave crystalline 2,4b - dimethyl - 7 - ethylenedioxy - 1,2,3,4,4a,4b,5,6,7, 8,10,10a - dodecahydrophenanthrene - 1,4 - dione, M. P. 130–145° C. Chromatography over alumina and elution with petroleum ether-ether (8:2) gave two purified isomers, M. P. 135–136° C. and 152–153° C. Hydrolysis of the isomers with acid yields the corresponding 1,4,7-trione compounds.

EXAMPLE 18

*4b-methyl-2-acetyl-7-ethylenedioxy-1,2,3,4,4a,4b,5,6,7,8, 10,10a-dodecahydrophenanthrene-1,4-dione*

To a suspension of 0.60 g. of anhydrous sodium methoxide in 10 cc. of benzene was added 150 g. of 4b-methyl-7-ethylenedioxy-1,2,3,4,4a,4b,5,6,7,8,10,10a-dodecahydrophenanthrene-1,4-dione and 1.65 cc. of methyl acetate. The mixture was stirred in an oxygen-free atmosphere at room temperature for sixteen hours. Ice water was added and the cold aqueous solution was extracted with benzene-ether and then neutralized with excess cold aqueous sodium dihydrogenorthophosphate. The resulting aqueous suspension was extracted with chloroform. Concentration of the chloroform followed by crystallization from acetone gave 4b-methyl-2-acetyl-7-ethylenedioxy-1,2,3,4, 4a,4b,5,6,7,8,10,10a-dodecahydrophenanthrene -1,4-dione, M. P. 173–176° C. After purification by recrystallization from acetone, the pure product melted at 176–177° C. On treatment with acid this compound is hydrolyzed to 4b-methyl-2-acetyl-1,2,3,4,4a,4b,5,6,7,9,10,10a-dodecahydrophenanthrene-1,4,7-trione.

EXAMPLE 19

*2,4b - dimethyl-2-acetyl-7-ethylenedioxy-1,2,3,4,4a,4b,5,6, 7,8,10,10a-dodecahydrophenanthrene-1,4-dione*

A suspension of 0.80 g. of anhydrous potassium carbonate in 8 cc. of acetone containing 0.41 g. of 4b-methyl-2 - acetyl-7-ethylenedioxy-1,2,3,4,4a,4b,5,6,7,8,10,10a-dodecahydrophenanthrene-1,4-dione was treated with 1.0 cc. of methyl iodide and stirred in a closed system at room temperature for sixteen hours. Acetone and excess methyl iodide were evaporated in vacuo and the residual salts were triturated thoroughly with dry benzene. Evaporation of the benzene gave 2,4b-dimethyl-dimethyl-2-acetyl - 7 - ethylenedioxy - 1,2,3,4,4a,4b,5,6,7,8,10,10a-dodecahydrophenanthrene-1,4-dione, M. P. 180–198° C. The pure compound melted at 200–203° C. After three recrystallizations from acetone. Hydrolyzing this product with acid yields 2,4b-dimethyl-2-acetyl-1,2,3,4,4a,4b,5,6, 7,9,10,10a-dodecahydrophenanthrene-1,4,7-trione.

EXAMPLE 20

*2,4b-dimethyl-7-ethylenedioxy-1,2,3,4,4a,4b,5,6,7,8,10, 10a-dodecahydrophenanthrene-1,4-dione*

A solution of 0.13 g. of 2,4b-dimethyl-2-acetyl-7-ethylenedioxy - 1,2,3,4,4a,4b,5,6,7,8,10,10a - dodecahydrophenanthrene-1,4-dione in 6 cc. of 1 N potassium carbonate in 50% aqueous methanol was heated under reflux for three hours. Water was added, the methanol was distilled under reduced pressure and the aqueous solution was extracted with chloroform. Evaporation of the chloroform solution gave 2,4b-dimethyl-7-ethylenedioxy-1,2,3,4,4a,4b,5,6,7,8,10,10a - dodecahydrophenanthrene-1, 4-dione, M. P. 112–140° C. Recrystallization from ether gave a stereochemical modification melting at 149–150.5° C.

EXAMPLE 21

*2,4b - dimethyl-2-acetyl-7-ethylenedioxy-1,2,3,4,4a,4b,5,6, 7,8,10,10a-dodecahydrophenanthrene-1,4-dione*

To a mixture of 0.31 g. of chromium trioxide in 3 cc. of pyridine was added a solution of 0.30 g. of 2,4b-dimethyl-2-acetyl-7-ethylenedioxy - 1,2,3,4,4a,4b,5,6,7,8,10, 10a-dodecahydrophenanthrene-4-ol-1-one in 3 cc. of pyridine. The reactants were mixed thoroughly and then allowed to stand in a closed vessel at room temperature for sixteen hours. Water was added to the reaction mixture and the resulting suspension was extracted with benzene-ether. After washing and drying, the organic solution was evaporated to give 2,4b-dimethyl-2-acetyl-7-ethylenedioxy-1,2,3,4,4a,4b,5,6,7,8,10,10a - dodecahydrophenanthrene-1,4-dione, M. P. 195–202° C.

EXAMPLE 22

*2,4b-dimethyl-7-ethylenedioxy-1,2,3,4,4a,4b,5,6,7,8,10, 10a-dodecahydrophenanthrene-1,4-dione*

A solution of 0.29 g. of 2,4b-dimethyl-7-ethylenedioxy-1,2,3,4,4a,4b,5,6,7,8,10,10a - dodecahydrophenanthrene-4-ol-1-one in 3 cc. of pyridine was added to a mixture of 0.30 g. of chromium trioxide in 3 cc. of pyridine. After thorough mixing, the reaction mixture was kept in a stoppered flask at room temperature for two hours. The contents of the flask were poured into water and then extracted with benzene-ether. The organic layer was washed with water, dried and concentrated to give 2,4b-dimethyl-7-ethylenedioxy-1,2,3,4,4a,4b,5,6,7,8,10,10a-dodecahydrophenanthrene-1,4-dione melting at 135–136° C. Passage of this material (M. P. 135–136° C.) over alkaline alumina in ether-petroleum ether gave a modification melting at 115–116° C.

Both the 135° C. and 115° C. materials were converted to a third modification melting at 149–150.5° C. by boiling in 1 N $K_2CO_3$ in 75% methanol, distilling the methanol, extracting with chloroform, removing the chloroform and recrystallizing the residue from ether.

EXAMPLE 23

*4b-methyl - 2 - hydroxymethylene-7-ethylenedioxy-1,2,3,4, 4a,4b,5,6,7,8,10,10a-dodecahydrophenanthrene-4-ol-1-one*

Sodium methoxide was prepared from 4.6 g. (0.2 g. atoms) of sodium and 110 cc. of methanol. To this was added 14.6 g. (0.05 mole) of 4b-methyl-7-ethylenedioxy-1,2,3,4,4a,4b,5,6,7,8,10,10a-dodecahydrophenanthrene - 4-ol-1-one and 30.0 g. (0.5 mole) of methyl formate. The resultant heterogeneous mixture was stirred under a nitrogen atmosphere at room temperature for 22.5 hours. During this period the reaction mixture slowly became tan and part of the solid went into solution. This mixture was poured into 600 cc. of water; extraction with ether gave after drying and concentration 0.6 g. of neutral crystalline residue. The aqueous layer was acidified with sodium dihydrogen phosphate; this buffered solution was carefully acidified further (to pH 4) with hydrochloric acid and rapidly extracted with benzene several times. After drying and concentration there was obtained 16.3 g. of crude enolic fraction as a tan solid residue. It was dissolved in acetone, decolorized with activated charcoal and the solution concentrated until crystallization began in the hot solvent. After cooling a first crop of 10.5 g. of 4b-methyl-2-hydroxymethylene-7-ethylenedioxy - 1,2,3,4,4a,4b,5,6,7,8,10,10a-dodecahydrophenanthrene-4-ol-1-one, M. P. 185–200° C., of white crystals was collected. Further concentration of the mother liquor gave a second crop of 2.4 g. M. P. 180–195° C., bringing the yield to 81%. Recrystallization from ethylene dichloride gave crystals melting at 203–204° C. An immediate violet color was obtained with alcoholic ferric chloride. The infrared spectrum showed maxima at 2.82μ (OH) and a broadband centered at 6.15μ (COCHCO). A maximum occurred in the ultraviolet region at 287 mu, E mol 1950.

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting 4b-methyl-2-formyl - 7 - ethylenedioxy - 1,2,3,4,4a,4b,5,6,7,8,10,10a-dodecahydrophenanthrene-4-ol-1-one with methyl iodide in the presence of an alkali metal carbonate to produce 2,4b - dimethyl - 2 - formyl - 7 - ethylenedioxy - 1,2,3,4,-4a,4b,5,6,7,8,10,10a - dodecahydrophenanthrene - 4 - ol-1-one.

2. The process which comprises reacting 4b-methyl-2-acetyl - 7 - ethylenedioxy - 1,2,3,4,4a,4b,5,6,7,8,10,10a-dodecahydrophenanthrene-4-ol-1-one with methyl iodide in the presence of an alkali metal carbonate to produce 2,4b - dimethyl - 2 - acetyl - 7 - ethylenedioxy - 1,2,3,4,-4a,4b,5,6,7,8,10,10a - dodecahydrophenanthrene - 4 - ol-1-one.

3. The process which comprises reacting 4b-methyl-2-acetyl - 4 - acetoxy - 7 - ethylenedioxy - 1,2,3,4,4a,4b,5,-6,7,8,10,10a-dodecahydrophenanthrene-1-one with methyl iodide in the presence of an alkali metal carbonate to produce 2,4b - dimethyl - 2 - acetyl - 4 - acetoxy - 7 - ethylenedioxy - 1,2,3,4,4a,4b,5,6,7,8,10,10a - dodecahydrophenanthrene-1-one.

4. The process which comprises reacting 4b-methyl-2-formyl - 7 - ethylenedioxy - 1,2,3,4,4a,4b,5,6,7,8,10,10a-dodecahydrophenanthrene - 1,4 - dione with methyl iodide in the presence of an alkali metal carbonate to produce 2,4b - dimethyl - 2 - formyl - 7 - ethylenedioxy - 1,2,3,4,-4a,4b,5,6,7,8,10,10a - dodecahydrophenanthrene - 1,4-dione.

5. The process which comprises reacting 4b-methyl-2-carbomethoxy - 7 - ethylenedioxy - 1,2,3,4,4a,4b,5,6,7,8,-10a - dodecahydrophenanthrene - 1,4 - dione with methyl iodide in the presence of an alkali metal carbonate to produce 2,4b - dimethyl - 2 - carbomethoxy - 7 - ethylenedioxy - 1,2,3,4,4a,4b,5,6,7,8,10,10a - dodecahydrophenanthrene-1,4-dione.

6. The process which comprises reacting a compound of the formula:

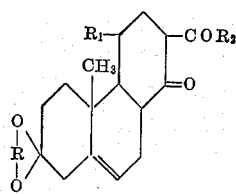

wherein R is an alkylene group having 2 to 4 carbon atoms, R₁ is a member from the group consisting of keto, hydroxyl and lower alkanoyloxy radicals, and R₂ is a member from the group consisting of lower alkyl and lower alkoxy radicals, with methyl iodide in the presence of an alkali metal carbonate to produce a compound of the formula:

wherein R, R₁, and R₂ are the same as defined above.

7. The process which comprises reacting a compound of the formula:

wherein R is an alkylene group having 2 to 4 carbon atoms and R₁ is a member from the group consisting of keto, hydroxyl and lower alkanoyl-oxy radicals, with a member from the group consisting of lower alkyl esters of lower alkanoic acids and lower alkyl esters of carbonic acid in the presence of an alkaline condensing agent from the group consisting of alkali metal hydrides, alkali metal amides and alkali metal alkoxides, and reacting the resulting reaction product with methyl iodide in the presence of an alkali metal carbonate to produce a compound of the formula:

wherein R and R₁ are the same as defined above and R₂ is a member from the group consisting of lower alkyl and lower alkoxy.

8. 2,4b - dimethyl - 2 - formyl - 7 - ethylenedioxy-1,2,3,4,5,6,7,8,10,10a - dodecahydrophenanthrene - 4 - ol-1-one.

9. 2,4b - dimethyl - 2 - acetyl - 7 - ethylenedioxy-1,2,3,4,4a,4b,5,6,7,8,10,10a - dodecahydrophenanthrene-4-ol-1-one.

10. 2,4b - dimethyl - 2 - acetyl - 4 - acetoxy - 7 - ethylenedioxy - 1,2,3,4,4a,4b,5,6,7,8,10,10a - dodecahydrophenanthrene-1-one.

11. 2,4b - dimethyl - 2 - formyl - 7 - ethylenedioxy-1,2,3,4,4a,4b,5,6,7,8,10,10a - dodecahydrophenanthrene-1,4-dione.

12. 2,4b - dimethyl - 2 - carbomethoxy - 7 - ethylenedioxy - 1,2,3,4,4a,4b,5,6,7,8,10,10a - dodecahydrophenanthrene-1,4-dione.

13. A dodecahydrophenanthrene compound from the group consisting of compounds of the formula:

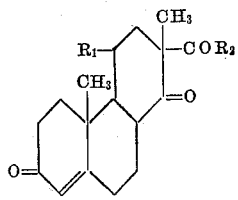

wherein $R_1$ is a member from the group consisting of keto, hydroxyl and lower alkanoyl-oxy radicals and $R_2$ is a member from the group consisting of lower alkyl and lower alkoxy, and 7-alkylenedioxy ketals thereof wherein the alkylene radical contains 2 to 4 carbon atoms.

References Cited in the file of this patent

UNITED STATES PATENTS 2,617,828    Sarett et al.   ---------------- Nov. 11, 1952

OTHER REFERENCES

Lukes et al.: J. A. C. S., vol. 75, pages 1707–1712, April 5, 1953.
Cornforth et al.: J. A. C. S., 1949, pages 1855–70.
Friedmann et al.: Chem. and Ind., September 15, 1951, pages 777–8.
Sarett et al.: J. A. C. S., 74, 4974, 1952.